March 13, 1956  H. S. HIGHET ET AL  2,737,707

METHOD AND APPARATUS FOR FORMING FLANGED BEARINGS

Filed May 27, 1950  2 Sheets-Sheet 1

INVENTORS.
HUGH S. HIGHET
CLINTON E. WILCOX
BY
Fay, Golrick & Fay
ATTORNEYS

March 13, 1956 H. S. HIGHET ET AL 2,737,707
METHOD AND APPARATUS FOR FORMING FLANGED BEARINGS
Filed May 27, 1950 2 Sheets-Sheet 2
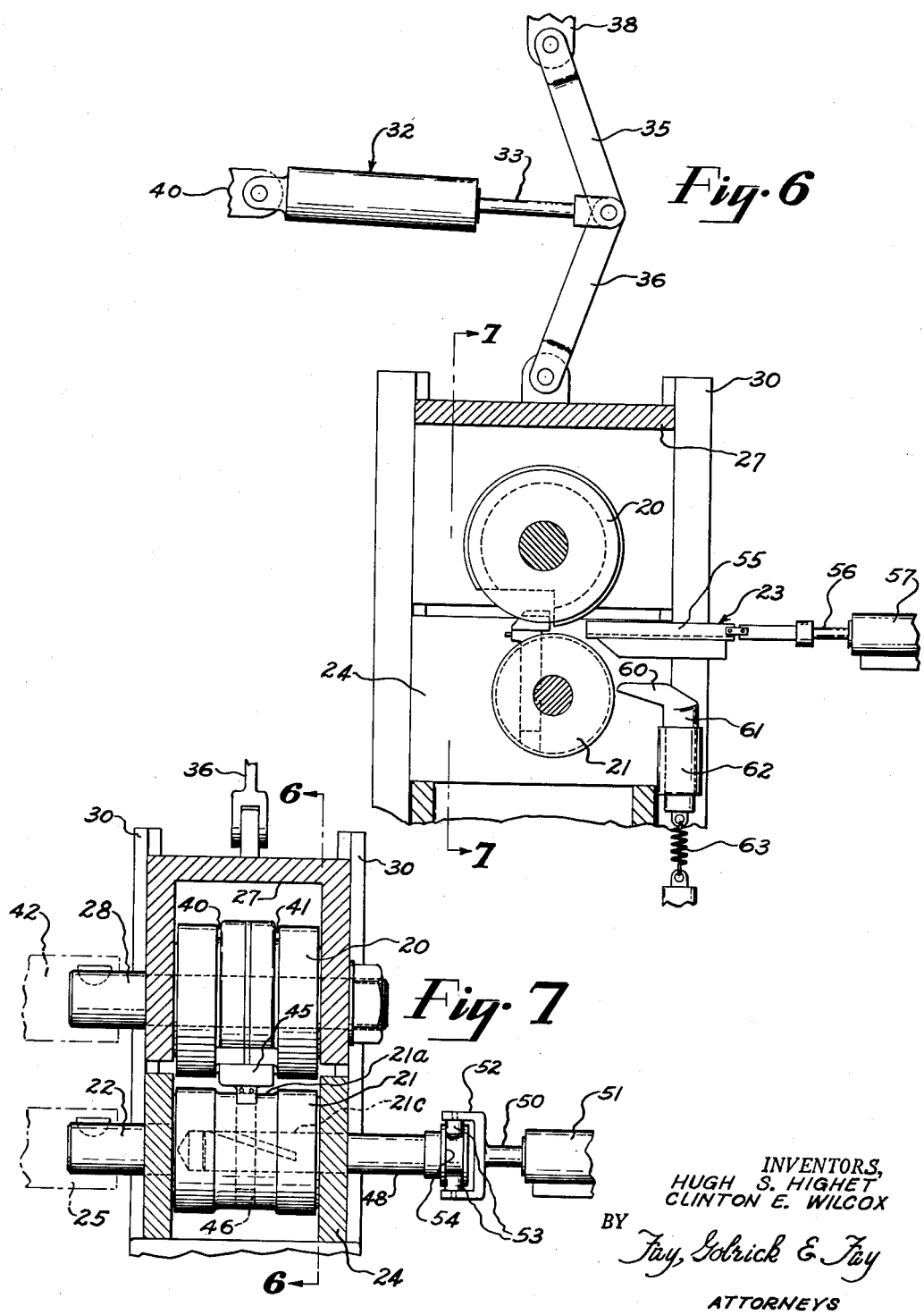
INVENTORS,
HUGH S. HIGHET
CLINTON E. WILCOX
BY
Fay, Golrick & Fay
ATTORNEYS

United States Patent Office 2,737,707
Patented Mar. 13, 1956

2,737,707
METHOD AND APPARATUS FOR FORMING FLANGED BEARINGS

Hugh S. Highet, Cleveland, and Clinton E. Wilcox, Bratenahl, Ohio, assignors to Clevite Corporation, a corporation of Ohio Application May 27, 1950, Serial No. 164,804

6 Claims. (Cl. 29—149.5)

The present invention relates to a method and apparatus for forming arcuate bearings, including bearings having end flanges.

An object of the invention is to provide a method of forming flanged bearings from straight channel shaped strips coated with bearing metal so that in the forming of the strip into an arc, the bearing metal on the flanges will not appreciably separate or split due to elongation.

Another object of the invention is to provide an apparatus for automatically and accurately forming semi-cylindrical bearings from straight strips coated with bearing metal.

A further object of the invention is to provide an apparatus for forming straight channel shape strips into arcuate bearings with flanged ends without an appreciable checking of the bearing surfaces on the flanges.

A still further object of the invention is to provide an apparatus for forming channel shape strips into arcuate bearings having end flanges, the apparatus being capable of producing precise dimensions of the flanges and the spacing between the flanges.

Other objects and advantages of the invention will be apparent from the following description of a preferred form of the invention, reference being made to the accompanying drawings wherein:

Fig. 6 is a schematic illustration of the apparatus for forming flanged bearings, the view being in section on line 6—6 of Fig. 7; and Fig. 7 is a view in section taken substantially on line 7—7 of Fig. 6.

It has been the practice to form arcuate bearings by coating a strip of relatively rigid backing material, such as steel, with a layer of bearing metal, after which the strip is cut into blanks of proper lengths and then the blanks are formed about a mandrel into semi-cylindrical arcs. In many instances it was desirable to provide end flanges on the bearing to take care of end thrusts, and it has been customary to provide such flanges by turning down the side portions of the coated bearing blanks to form a channel shape blank and simultaneously forming the blank into a semi-cylinder by a bending operation. One difficulty encountered in the process was that in forming the flanged blank into an arcuate shape the bearing metal on the faces of the flanges would separate along radial lines due to elongation of the flange metal and in many instances the flange surfaces of the bearings would have a decidedly checked appearance and the bearing surface would chip and rapidly deteriorate in use.

An object of the present invention is to eliminate or reduce the degree of cracking or separation of the bearing metal on the faces of the flanges, so that the bearing faces of the flanges will have a smooth continuous appearance and will hold up well under use.

In carrying out the present invention, the flanges on the blank are slightly deeper than the depth desired on finished bearing and while the blank is being curved pressure is applied to the outer edge of the blank tending to compress the flange while the sides of the flange are confined. Also, a burnishing action is applied to the flange with the compression which results in a more or less flow of the material forming the flange so that the outer portions of the flanges will elongate without the usual degree of separation of the bearing material on the flange.

It will be seen that the combined action of compressing the flange and securing the bearing to one of the roller dies will produce a drawing action, particularly when it is seen that the roller die members are in pressure contact one with the other. In addition, however, since one of the roller dies, i. e., the second roller, produces a burnishing action, this roller must move faster than said other roller, and by this means produces a rolling action; consequently the sum total of these forces is one of drawing and rolling.

Figure 4:
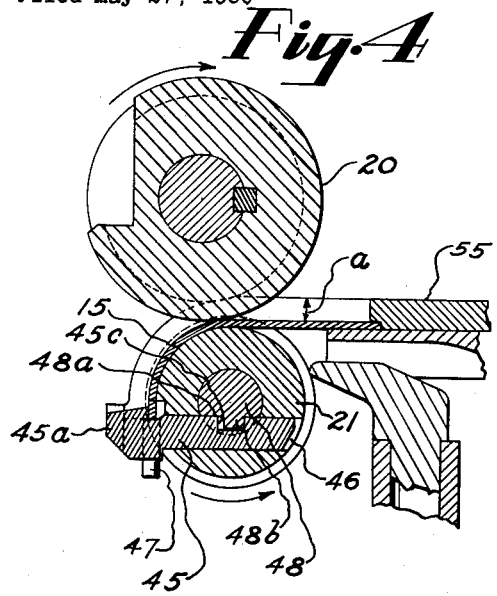
Figs. 4 and 5 are cross-sectional views showing the formation of a flanged bearing in the rolls of the bearing forming apparatus.
Figure 1:
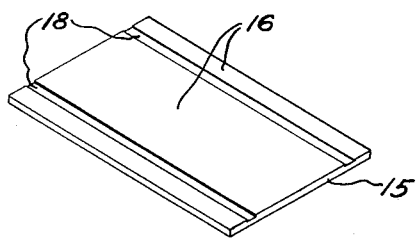
Fig. 1 is a perspective view of a blank prior to its formation into a semi-cylindrical bearing.
Figure 2:
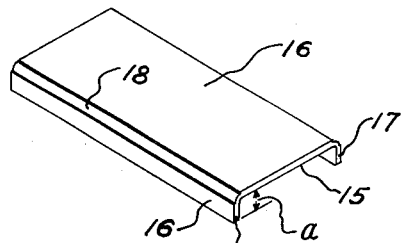
Fig. 2 is a view of a bearing blank with flanges formed thereon.
Figure 3:
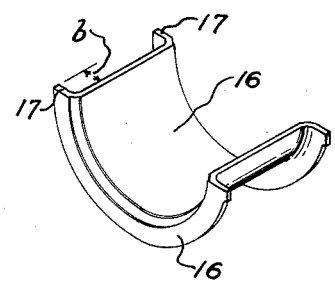
Fig. 3 is a view of a semi-cylindrical flanged bearing.

Referring to Figs. 1 to 3, there is shown a bearing blank 15 formed of a sheet of steel having a layer 16 of a suitable bearing material coated thereon, as by pouring, for example. The blank is to have flanges 17 formed thereon as shown in Figs. 2 and 3 and to prevent checking of the bearing metal during the formation of the flanges, grooves 18 are milled or broached in the bearing metal to remove substantially all such metal along the lines of bends. The flanges are then formed in a suitable bending machine with the height of the flanges slightly in excess of the height desired in the finished bearing. For example, the dimension $a$ of the blank shown in Fig. 2 will be greater than dimension $b$ shown in Fig. 3, which shows the finished bearing. During the bending of the flanged blank into the semi-cylindrical finished form the flanges are compressed and burnished along the outer edges while the sides are confined so that the metal of the flanges may elongate without appreciably disturbing the bearing metal on the flanges. After the bearing is formed, the bearing surfaces, including those on the flanges, are machined to size.

The apparatus for forming the flanged blank shown in Fig. 2 into the finished bearing shown in Fig. 3, comprises a pair of forming rolls 20 and 21 which cooperate to bend the blank into an arcuate form while the outer edges of the flanges are compressed and burnished. The blanks are fed to the rolls by a sliding feed mechanism 23 and the feeding mechanism and rolls may be operated in proper sequence by a hydraulic control system, for example, which is not shown.

The roll 21 is keyed to a shaft 22 journalled in a suitable bed, indicated in part at 24, and the shaft is adapted to be driven by a suitable reversible power unit, which may be an hydraulic motor, partially shown at 25.

The central portion of roll 21 is contoured as at 21a to conform to the inner surface of the bearing plate 15 and it includes opposed curved sections which are complementary to the portion of the bearing at the base of the flange.

The roll 20 is mounted in a vertically sliding yoke 27 on a drive axle 28 which is journalled in the yoke. The yoke is slidably mounted in a vertical guideway 30 and it is raised and lowered by an hydraulic piston motor 32, the piston 33 of which actuates a toggle mechanism consisting of links 35 and 36, pivotally joined at the piston connection. One end of link 35 is pivotally anchored to a suitable bracket 38 and the opposite end of link 36 is pivotally connected to the yoke 27. The cylinder of the hydraulic motor is pivotally anchored at 40 so that the piston may actuate the toggle links into and out of dead center position which results in lowering and raising the yoke 27, respectively. It will be appreciated that when the toggle is in dead center, or slightly to the left of dead center, as viewed in Fig. 6, with the piston against a stop, the yoke will be locked in the lowered position to compress roll 20 against the flanges of the bearing blank, as will be more fully explained hereinafter. The piston is actuated by a suitable control system, not shown, to raise and lower the roll 20 at the proper intervals as will be more fully explained hereinafter. The roll 20 is keyed to shaft 28 and it is formed with two spaced grooves 40, 41 which are adapted to receive the flanges of the bearing blank and the portion of the roll intermediate the grooves is adapted to bear on the blank intermediate the flanges. The depth of the grooves 40, 41 correspond to the finished dimensions of the bearing flanges so that the flanges are compressed as to depth as they are bent into arcuate form. The shaft 28 is driven by suitable reversible torque means, partially shown at 42 and which may be the same as that which drives roll 21. The speed at which roll 20 is driven is such that the bottom walls of the grooves 40, 41 travel somewhat faster than the outer edges of the flanges of the bearing blanks whereby the flanges are burnished as they are compressed and bent. This burnishing action materially assists in causing proper flowing of the flange metal without separation occurring.

The leading end of the bearing blank is held to the roll by a device which automatically grips the end of the blank when the blank is fed between the rolls. This device consists of a latching member 45 which is adapted to slide in a direction transversely of the axis of the roll in an opening 46 in the roll. The outer end of the member 45 is provided with a head 45a having a jaw 45b which is adapted to engage the end of the bearing blank 15 and press it firmly to roll 21 when the member 45 is moved inwardly relative to the roll. The jaw 45b is recessed at opposite sides for receiving the ends of the flanges 17 of the bearing plate and to grip these flanges. Two knock-out pins 47 are mounted in openings through the head portion 45a, and these pins move longitudinally to eject the formed bearing from roll 21 as will be described more fully hereinafter.

The latch member 45 is adapted to be reciprocated in opening 46 by a cam shaft 48, which is adapted to move longitudinally in an axial opening 21c formed in roll 21. The cam shaft has a flattened area 48a on which a ridge 48b is formed extending obliquely to the axis of the rod and which ridge projects into a groove 45c formed in the member 45. Thus, when the rod 48 is moved inwardly member 45 is drawn downwardly, as viewed in Fig. 6, for clamping the end of the bearing blank to the roll 21 and when the rod 48 is moved outwardly member 45 is moved to release the blank.

The cam shaft 48 is actuated by a piston 50 operating in a hydraulic cylinder 51 and the piston is swivelly connected to the shaft by a yoke 52 having pins 53 which project into a groove formation 54 on the end of the shaft so that the shaft may rotate relative to the piston. The operation of the piston is timed by the control system, not shown, so that the clamp member 45 is operated to the clamping and releasing positions at the proper times.

The feeding mechanism 23 comprises a sliding carriage 55 which is formed to receive the flat blanks with the flanges extending upwardly and which is reciprocated from the loading position toward the rolls for introducing the blank between the latter by an hydraulically operated piston 56. The piston 56 is actuated in a cylinder 57 connected to an hydraulic system through appropriate control valves, not shown, so that the slide is automatically operated at the proper times.

The formed bearings are stripped from roll 21 by the ejector pins 47 which engage a projecting jaw 60 of a stop member 61. The stop member 61 is slidably mounted in a guide 62 and the member is yieldingly positioned in the guide by a tension spring 63 so that overtravel of the roll will not cause breakage of the stop.

Figure 5:
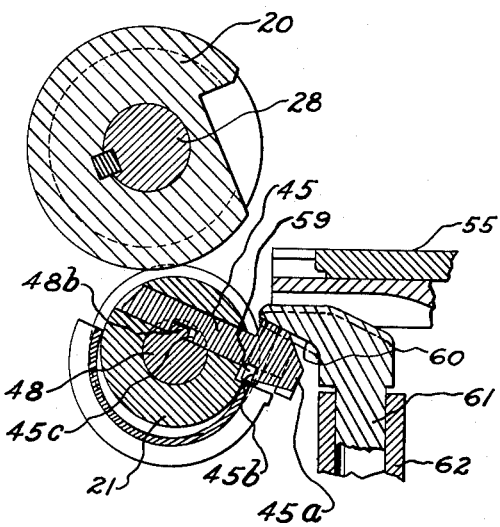

In the operation of the machine the bearing blanks 15 are individually inserted into the feed mechanism 23 and the control system for the apparatus is activated to cause member 55 to advance the bearing blank tangentially to roll 21 and beneath the jaw of the clamp member 45. At this time the clamp member 45 is actuated to clamp the end of the blank 15 to the roll 21 and piston 33 is actuated to press roll 20 against the flanges 17 of the bearing blank. The motor drive for rolls 20, 21 is then actuated to cause rotation of the rolls in opposite directions for feeding the blank 15 therebetween which causes the blank to be bent into an arcuate form about the periphery of roll 21. The motor drive is controlled by suitable limit devices, not shown, to cause the rolls to rotate through approximately 247° after which the rolls are rotated in reverse to their original positions. During the bending operation the material forming the flanges 17 of the bearing is compressed at the outer edge and at the same time burnished which causes the metal to flow longitudinally in such a manner that the bearing metal supported on the backing material which forms the blank 15 will not crack materially, and when surface ground in the finishing operation it will have a smooth homogeneous appearance. As the rolls approach the end of their rotation during the bending operation the locking member 45 will be released and piston 33 will be operated to cause raising of the roll 20 from roll 21. At the same time, ejector pins 47 in the latching member 45 engage the ejector member 61 and the force of spring 63 reacts through member 61 to cause pins 47 to push the formed bearing member from the roll 21 as may be clearly seen in Fig. 5. The motor drive for the rolls is immediately reversed after the ejection of the bearing from the roll 21 and the rolls are returned to their original bearing blank receiving position for a subsequent bearing forming operation.

It will be noted in Fig. 3, that the flanges at the leading end portion of the bearing blank will not be compressed where the clamp grips the blank and for this reason the blank is longer than would be required to provide a 180° arcuate bearing and in the finishing process the enlarged end of the bearing and a smaller segment of the opposite end are severed to provide the proper dimensions.

By using the grooved roller the exact dimensions may be maintained between the end flanges and also the proper thickness of the flanges are provided which eliminates further machining.

Having thus described our invention, we claim:

1. An apparatus for forming arcuate flanged articles comprising a first roller for receiving the edges of a strip having a base portion and a flange extending upwardly therefrom along at least one edge thereof, a second roller complementary to said first roller and opposite thereto adapted to engage the outer edges and surround the flanges of the strip of said flanged article, means for moving the rollers relative to one another to compress the article and the flange therebetween, means on said first roller for securing said article to said first roller, said rollers in engaging position being separated by a distance less than the height of the flange, means for rotating the rollers to form the strip about the first mentioned roller and means for rotating said second roller faster than said first roller to produce a burnishing action on said flange faces.

2. An apparatus for forming arcuate bearings having end flanges comprising a first roller adapted to receive a strip having flanges along the edges thereof, a second roller complementary to said first roller and opposite thereto adapted to engage the outer edges of said flanged strip and surround the flange, means for moving the rollers relative to one another to compress the strip and the flanges therebetween, means on said first roller for securing said strip to said first roller, said rollers when in engaging position being separated by a distance less than the height of the flanges, means for rotating the rollers to form the strip along the first mentioned roller and means for rotating said second roller faster than said first roller to produce a burnishing action on said flanges.

3. In an apparatus for forming arcuate bearings having end flanges, a roller die adapted to receive a bearing strip, clamping means on the roller for securing one end of the strip to the periphery of the roller, feed means adapted to place a bearing strip between said roller and a second roller complementary to said first roller and opposite thereto, adapted to engage the outer edge of said flanged bearings and surround the flanges forming grooves in the roller, means for moving said rollers relative to one another to compress the flanges and the bearing therebetween, the depth of the grooves in the rollers for said flanges being less than the height of the flange when in engaging position, driving means for rotating said first roller, means for rotating said second roller faster than said first roller to produce a burnishing action on said flanges.

4. The method of forming an arcuate article having radial end flanges, which method comprises forming a flat strip having an upstanding flange along at least one edge thereof, bending the strip with the flange on the outside of the arc while drawing and rolling said article between die members, compressing the flange along the outer edges while one of said die members is moving faster relative to said other die member to produce a burnishing action upon said flange face.

5. A method of forming an arcuate bearing having a radial end flange, which method comprises forming a strip with an upstanding flange along at least one side thereof, said flange being of greater height than that in the final product, bending and drawing said strip in an arc between die members with the flange on the outside of the arc, and compressing the flange radially in said drawing action along the outer edge during the bending thereof, and moving one of said die members faster than the other to produce a burnishing action on said flange.

6. The method of forming an arcuate bearing having a radial end flange, which method comprises forming a strip having an upstanding flange along at least one side thereof, bending and drawing the strip in an arc between die members with the flange on the outside of the arc, compressing the flange radially between said members while confining the sides of the flange during the bending thereof and burnishing the flange faces while compressing and confining them by moving one of said die members faster relative to said other die member, whereby the checking of said bearing metal on the flange face is avoided.

References Cited in the file of this patent

UNITED STATES PATENTS

| Number | Name | Date |
|---|---|---|
| 7,704 | Lee | Oct. 8, 1850 |
| 264,541 | Lambert | Sept. 9, 1882 |
| 327,721 | Richter | Oct. 6, 1885 |
| 1,262,882 | Warner | Apr. 16, 1918 |
| 1,629,751 | Wemlinger | May 24, 1927 |
| 2,089,169 | Anderson | Aug. 10, 1937 |
| 2,097,692 | Fiegel | Nov. 2, 1937 |
| 2,118,959 | Whitehead et al. | May 31, 1938 |
| 2,124,132 | Bate | July 19, 1938 |
| 2,333,227 | Bagley | Nov. 2, 1943 |
| 2,444,718 | Bath | July 6, 1948 |
| 2,465,101 | Johnson | Mar. 22, 1949 |